(12) United States Patent
Kim et al.

(10) Patent No.: US 9,356,482 B2
(45) Date of Patent: May 31, 2016

(54) ROTOR FIXING UNIT FOR DRIVE MOTOR

(71) Applicant: Hyundai Motor Company, Seoul (KR)

(72) Inventors: Kyoungbum Kim, Gyeonggi-do (KR); Hyoungjun Cho, Seoul (KR); Sanghoon Moon, Gyeonggi-do (KR); Jung Shik Kim, Seoul (KR); Woong Chan Chae, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 233 days.

(21) Appl. No.: 14/278,439

(22) Filed: May 15, 2014

(65) Prior Publication Data

US 2015/0171701 A1      Jun. 18, 2015

(30) Foreign Application Priority Data

Dec. 18, 2013   (KR) ........................ 10-2013-0158572

(51) Int. Cl.
| | |
|---|---|
| *H02K 1/06* | (2006.01) |
| *H02K 1/30* | (2006.01) |
| *H02K 1/28* | (2006.01) |
| *H02K 1/22* | (2006.01) |
| *H02K 1/18* | (2006.01) |

(52) U.S. Cl.
CPC .. *H02K 1/30* (2013.01); *H02K 1/06* (2013.01); *H02K 1/18* (2013.01); *H02K 1/22* (2013.01); *H02K 1/28* (2013.01)

(58) Field of Classification Search
CPC ............. H02K 1/06; H02K 1/22; H02K 1/28; H02K 1/18; H02K 1/30
USPC ......... 310/67 R, 216.123, 56.09, 156.13, 420
See application file for complete search history.

(56) References Cited

U.S. PATENT DOCUMENTS 5,889,346 A      3/1999   Uchida et al.

FOREIGN PATENT DOCUMENTS

| JP | 07-264818 | 10/1995 |
|---|---|---|
| JP | 4929714 B2 | 5/2012 |
| KR | 10-1270891 | 6/2013 |

*Primary Examiner* — Terrance Kenerly
(74) *Attorney, Agent, or Firm* — Mintz Levin Cohn Ferris Glovsky and Popeo, P.C.; Peter F. Corless (57) ABSTRACT

A rotor fixing unit for a drive motor serves which fixes a rotor core to a shaft is provided. In particular, a plurality of keyway portions, which includes first keyways formed in an axial direction of the shaft, and second keyways connected to the first keyways in a rotation direction, are formed in an outer circumferential surface of the shaft. Additionally, a plurality of key protrusions, which are each coupled to each of the keyway portions, respectively, are formed on an inner circumferential surface of the rotor core, and fixing members for fixing the shaft and the rotor core are then inserted into the first keyways to fix the key protrusions in the second keyways.

13 Claims, 5 Drawing Sheets

ROTOR FIXING UNIT FOR DRIVE MOTOR

CROSS-REFERENCE TO RELATED APPLICATION

This application claims priority to and the benefit of Korean Patent Application No. 10-2013-0158572 filed in the Korean Intellectual Property Office on Dec. 18, 2013, the entire contents of which are incorporated herein by reference.

BACKGROUND OF THE INVENTION (a) Field of the Invention

The present invention relates to a drive motor, and more particularly, to a rotor fixing unit for a drive motor f a rotor to a shaft.

(b) Description of the Related Art

In general, a hybrid vehicle or an electric vehicle, often referred to as an environmentally-friendly vehicle, is driven typically by an electric motor (hereinafter, referred to as a "drive motor") that produces torque from electrical energy.

Hybrid vehicles are capable of being driven in an electric vehicle (EV) mode, (that is a pure electric vehicle mode which uses only power from the drive motor to operate the vehicle), or in a hybrid electric vehicle (HEV) mode, (using both torque from an engine and torque from the drive motor as power) in order to reduce the amount of emissions which the vehicle produces and decrease fuel consumption. An 1 electric vehicle, on the other hand, is driven using only torque from the drive motor as power and has no other power source.

For example, the drive motor, which is used as a power source for these environmentally-friendly vehicles, is often a permanent magnet synchronous motor (PMSM). A permanent magnet synchronous motor has a stator, a rotor which is disposed to have a predetermined air gap between the stator and the rotor, and permanent magnets which are installed to the rotor. Depending on a method of installing the permanent magnets to the rotor, there are for the most part two types of permanent magnet synchronous motors, a surface permanent magnet motor (SPMM) in which the permanent magnets are installed on a surface of the rotor and an interior permanent magnet synchronous motor (IPMSM) in which the permanent magnets are embedded in the rotor.

In the permanent magnet synchronous motor, a rotor has a rotor core in which a plurality of sheets of steel plates are stacked, and the rotor core is fixed to and installed on an outer circumferential surface of a shaft.

In order to fix the rotor core in a rotation direction, the rotor core has a key protrusion which is formed to be fitted into a keyway that is formed in the outer circumferential surface of the shaft in an axial direction. Therefore, when the key protrusion is fitted into and coupled to the keyway of the shaft in the axial direction, t the rotor core becomes fixed to the outer circumferential surface of the shaft while supporting force in the rotation direction.

In addition, in the related art, in order to fix the rotor core in the axial direction, a retainer is often installed at an end plate side of the rotor core in a press-fit manner. Here, the end plate is made of a material having high magnetic resistance, is interposed between the retainer and the rotor core, and serves to minimize a leakage of magnetic flux. Therefore, when the retainer is installed at the end plate side of the rotor core, the rotor core may be fixed to the outer circumferential surface of the shaft while supporting force in the axial direction without having to worry about the key protrusion coming out of the keyway.

Here, in the aforementioned structure for fixing the rotor core in the axial direction, since materials of the end plate and the shaft are different from each other, the end plate and the shaft are not fixed to each other. As such, when a temperature is varied, the retainer, which is made of the same steel material as the rotor core, is press-fitted between the end plate and the shaft.

However, since this retainer is made of steel that has low magnetic resistance and thus the magnetic flux that is allowed to flow well, the magnetic flux may be leaked from the rotor core to the retainer. This affects the overall performance of the motor.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a rotor fixing unit for a drive motor which may prevent a leakage of magnetic flux due to a retainer, by eliminating the retainer.

An exemplary embodiment of the present invention provides a rotor fixing unit for a drive motor which serves to fix a rotor core to a shaft, in which i) a plurality of keyway portions, which includes first keyways formed in an axial direction of the shaft, and second keyways connected to the first keyways in a rotation direction, are formed in an outer circumferential surface of the shaft, ii) a plurality of key protrusions, which are coupled to each of the keyway portions, respectively, are formed on an inner circumferential surface of the rotor core, and iii) fixing members for fixing the shaft and the rotor core are coupled to the first keyways.

In addition, in the rotor fixing unit for a drive motor according to the exemplary embodiment of the present invention, the keyway portions may be formed in the outer circumferential surface of the shaft in order to be spaced apart from each other in the rotational direction at a specific interval.

In addition, in the rotor fixing unit for a drive motor according to the exemplary embodiment of the present invention, the rotor core may be coupled to the first keyway in the axial direction, and coupled to the second keyway in the rotation direction, through the key protrusion.

In addition, in the rotor fixing unit for a drive motor according to the exemplary embodiment of the present invention, the keyway portion may have a catching projection that connects the first keyway with the second keyway. The catching projection may be formed to have a width, which corresponds to that of the key protrusion, and may prevent the key protrusion from being pulled out in the axial direction. As such, the fixing member and the first keyway each may have a width that corresponds to that of the catching projection.

In addition, in the rotor fixing unit for a drive motor according to the exemplary embodiment of the present invention, the shaft may have an axial length that is longer than an axial length of the rotor core. Additionally in some embodiments, the first keyway may be formed to have a length that corresponds to a difference in axial length between the shaft and the rotor core and the key protrusions may be formed to have a length that corresponds to the axial length of the rotor core. As such, the second keyway may be formed to have a length that corresponds to the axial length of the key protrusion.

In addition, in the rotor fixing unit for a drive motor according to the exemplary embodiment of the present invention, the fixing member may have a length that corresponds to the axial length of the shaft.

Another exemplary embodiment of the present invention provides a rotor fixing unit for a drive motor which fixes a rotor core to a shaft, in which the rotor core is coupled to an outer circumferential surface of the shaft in an axial direction and a rotation direction of the shaft, and the shaft and the rotor core are fixed by fixing members embodied as a key.

In addition, in the rotor fixing unit for a drive motor according to the exemplary embodiment of the present invention, a plurality of keyway portions, which includes first keyways formed in the axial direction of the shaft, and second keyways connected to the first keyways in the rotation direction, may be formed in the outer circumferential surface of the shaft so as to be spaced apart from each other in the rotation direction at a predetermined interval. These key protrusions, which are coupled to the keyway portions, respectively, may be formed on an inner circumferential surface of the rotor core.

In addition, in the rotor fixing unit for a drive motor according to the exemplary embodiment of the present invention, the fixing members may be coupled to the first keyways specifically.

According to the exemplary embodiments of the present invention, the rotor core may be fixed in the axial direction and the rotation direction relative to the shaft, by the keyway portions of the shaft, the key protrusions of the rotor core, and the fixing members. Therefore, in the exemplary embodiment of the present invention, the rotor core may be fixed in the axial direction and the rotation direction relative to the shaft, by coupling of the keyway and the key protrusion, and the coupling of the fixing member, thereby eliminating the need for a retainer made of steel as is typically used in the related art.

Accordingly, in the exemplary embodiment of the present invention, the retainer in the related art, which is made of steel that has low magnetic resistance and thus allows magnetic flux to flow therethrough, is eliminated, so that a leakage of magnetic flux due to the retainer may be prevented from occurring, thereby improving efficiency of a motor through a reduction in copper loss and an improvement in output.

BRIEF DESCRIPTION OF THE DRAWINGS

The drawings are intended to be used as references for describing the illustrative exemplary embodiments of the present invention, and the accompanying drawings should not be construed as limiting the technical spirit of the present invention.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

A part irrelevant to the description will be omitted to clearly describe the present invention, and the same or similar elements will be designated by the same reference numerals throughout the specification.

The size and thickness of each component illustrated in the drawings are arbitrarily shown for understanding and ease of description, but the present invention is not limited thereto. Thicknesses of several portions and regions are enlarged for clear expressions.

Further, in the following detailed description, names of constituents, which are in the same relationship, are divided into "the first", "the second", and the like, but the present invention is not limited to the order in the following description.

Throughout the specification, unless explicitly described to the contrary, the word "comprise" and variations such as "comprises" or "comprising" will be understood to imply the inclusion of stated elements but not the exclusion of any other elements.

In addition, "unit", "means", "part", "member", or the like, which is described in the specification, means a unit of a comprehensive configuration that performs at least one function or operation.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, fuel cell vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "and/or" includes any and all combinations of one or more of the associated listed items.

Figure 1:
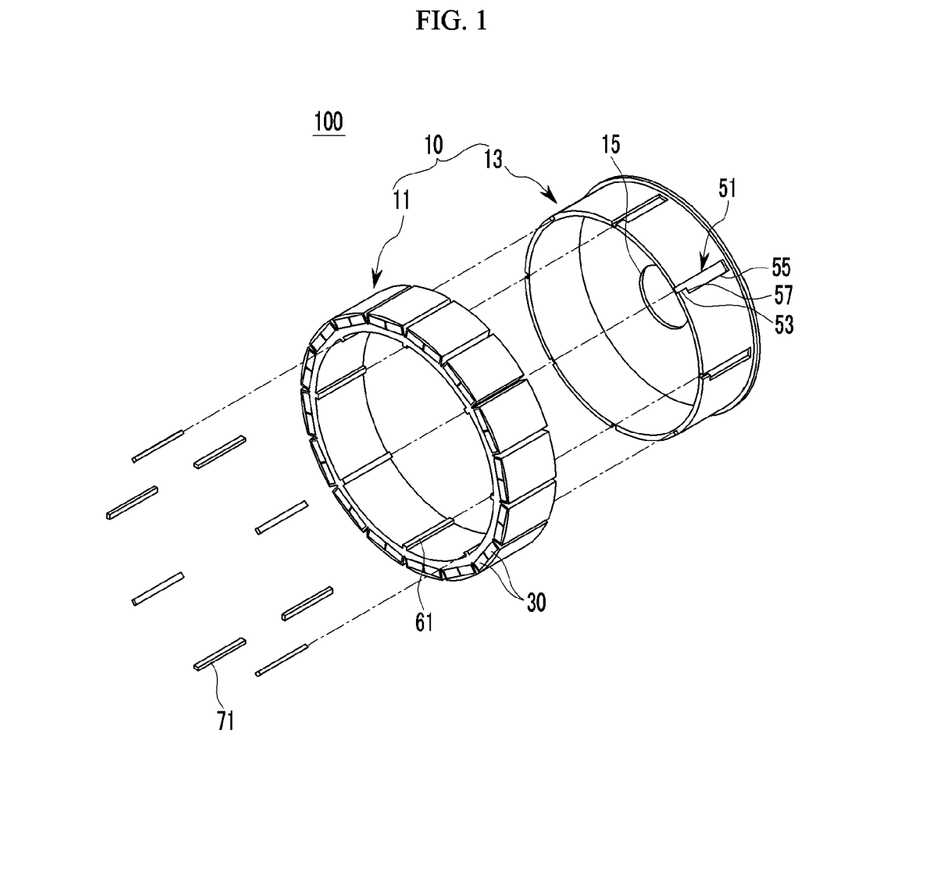
FIG. 1 is an exploded perspective view illustrating a rotor fixing unit for a drive motor according to an exemplary embodiment of the present invention.

FIG. 1 is an exploded perspective view illustrating a rotor fixing unit for a drive motor according to an exemplary embodiment of the present invention. Referring to FIG. 1, a rotor fixing unit 100 for a drive motor according to an exemplary embodiment of the present invention may be applied to a permanent magnet synchronous motor (PMSM) that is a drive motor which is utilized in an environmentally-friendly vehicle such as a hybrid vehicle, fuel cell vehicle or electric vehicle, for example, and obtains drive power from electrical energy.

In particular, as can be seen from FIG. 1, the permanent magnet synchronous motor includes a stator (not illustrated in the drawing), a rotor 10 according to the exemplary embodiment of the present invention which is disposed to have a predetermined air gap between the stator and the rotor, and permanent magnets 30 which are installed to the rotor 10.

Here, the rotor 10 includes a rotor core 11 in which a plurality of sheets of steel plates are stacked, and the rotor core 11 is fixed to and installed on an outer circumferential surface of a shaft 13 through the shown rotor fixing unit 100 according to the exemplary embodiment of the present invention. In this case, one end of the shaft 13 is opened, the other end of the shaft 13 is closed, the shaft 13 is formed in a cylindrical shape that has a shaft aperture 15 formed within the closed end, and the rotor core 11 may be fixed to an outer circumferential surface of the shaft 13.

Meanwhile, examples of the permanent magnet synchronous motor, to which the rotor fixing unit of the exemplary embodiment of the present invention is applied, may include a surface permanent magnet motor (SPMM) in which the permanent magnets 30 are installed on a surface of the rotor core 11, and an interior permanent magnet synchronous motor (IPMSM) in which the permanent magnets 30 are embedded in the rotor core 11.

In addition, examples of the permanent magnet synchronous motor, which are applied to the exemplary embodiment of the present invention, may include an interior rotor type synchronous motor in which the rotor core 11 is disposed inside a stator (not illustrated in the drawings), and an exterior rotor type synchronous motor in which the rotor core 11 is disposed outside the stator.

Hereinafter, for convenience of description, a structure of the interior rotor type synchronous motor in which the stator (not illustrated in the drawings) is provided outside the rotor core, and the rotor core 11 is rotated inside the stator, and a structure of the interior permanent magnet synchronous motor in which the permanent magnets 30 are embedded in the rotor core 11 will be described as an example. However, it should not be understood that the scope of the present invention is necessarily limited thereto, and the technical spirit of the present invention may be applied to various types of drive motors for various uses, such as a wound rotor synchronous motor, in addition to the aforementioned permanent magnet synchronous motor.

By eliminating a retainer that fixes the rotor core 11 in the axial direction in the related art, the aforementioned rotor fixing unit 100 for a drive motor according to the exemplary embodiment of the present invention is able to prevent magnetic flux leakage associated with the retainer.

Figure 2:
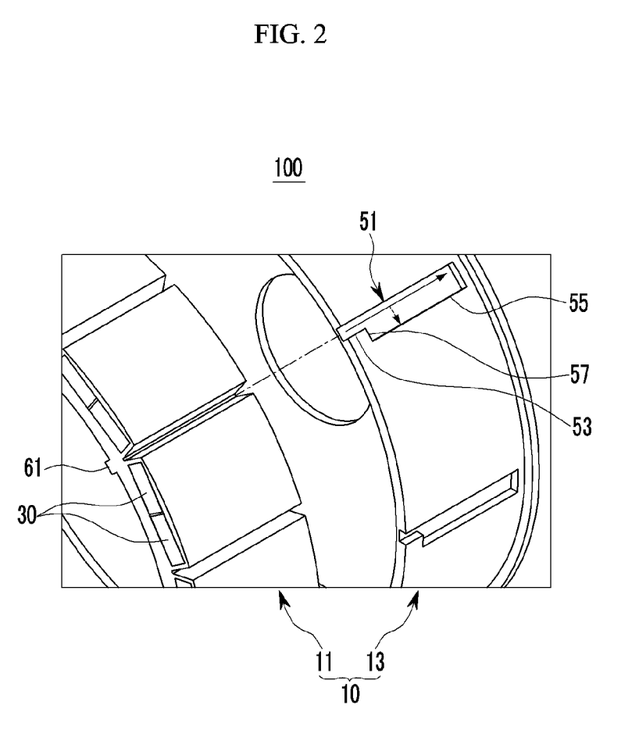
FIGS. 2 and 3 are partially exploded perspective views illustrating the rotor fixing unit for a drive motor according to the exemplary embodiment of the present invention.
Figure 3:
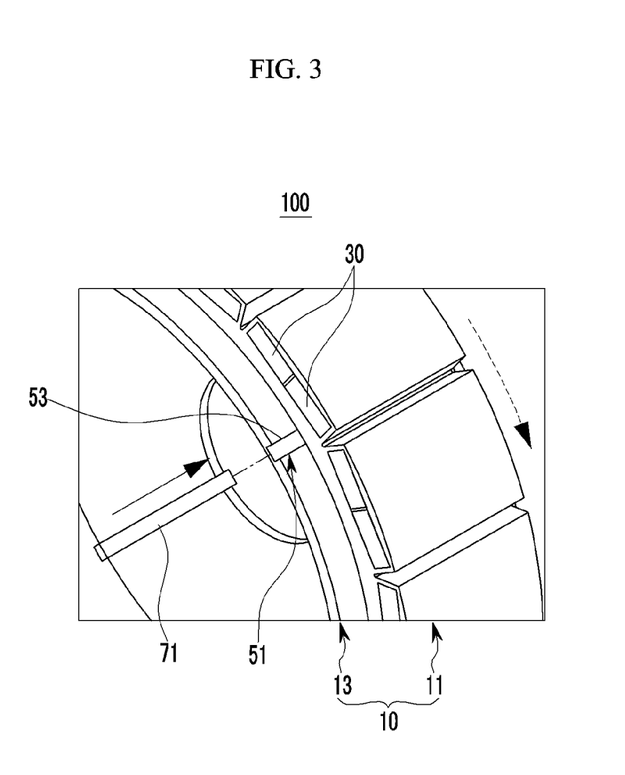

FIGS. 2 and 3 are partially exploded perspective views illustrating the rotor fixing unit for a drive motor according to the exemplary embodiment of the present invention. Referring to FIGS. 1 to 3, in the exemplary embodiment of the present invention, the rotor core 11 is coupled to the outer circumferential surface of the shaft 13 in an axial direction and a rotation direction of the shaft 13, and the rotor fixing unit 100 for a drive motor, which may fix the shaft 13 and the rotor core 11, is provided as a separate fixing means.

To this end, the rotor fixing unit 100 for a drive motor according to the exemplary embodiment of the present invention includes a plurality of keyway portions 51 which are formed in the shaft 13, a plurality of key protrusions 61 which are formed on the rotor core 11, and a plurality of fixing members 71 which fix the rotor core 11 to the shaft 13 once the key protrusions 61 are inserted in the keyway portions 51.

In the exemplary embodiment of the present invention, the keyway portions 51 serve to fix the rotor core 11 in the axial direction relative to the shaft 13, and have a structure that may couple the rotor core 11 to the outer circumferential surface of the shaft 13 in the axial direction and the rotation direction of the shaft 13. The keyway portions 51 are formed in the outer circumferential surface of the shaft 13 so as to be spaced apart from each other in the rotation direction (a circumferential direction) of the shaft 13 at a specific interval. Here, for example, the shaft 13 may have an axial length that is longer than an axial length of the rotor core 11.

Each keyway portion 51 may include a first keyway 53 which is formed in the axial direction of the shaft 13, and a second keyway 55 which is connected to the first keyway 53 in the rotation direction. The first keyway 53 is formed at an open end of the shaft 13 so as to have a specific axial length, and may be formed to have a length that corresponds to a difference in axial length between the shaft 13 and the rotor core 11.

Further, the second keyway 55 may be connected to the first keyway 53 in the rotation direction, and may be formed to extend toward a closed end of the shaft 13 at a specific length. That is, the second keyway 55 may be formed to have a width that is greater than a width of the first keyway 53 based on the rotation direction of the shaft 13. In this case, in some exemplary embodiments of the present invention, a catching projection 57, which connects the first keyway 53 with the second keyway 55, is also formed in the aforementioned keyway portion 51. The catching projection 57 may have a width that corresponds to that of the first keyway 53.

In the exemplary embodiment of the present invention, the key protrusions 61 are key-coupled to the keyway portions 51 of the shaft 13 in the axial direction and the rotation direction of the shaft 13, and are formed on an inner circumferential surface of the rotor core 11 so as to correspond to the keyway portions 51. That is, the key protrusions 61 may be coupled/inserted into the first keyways 53 of the keyway portions 51 in the axial direction, and then coupled/inserted into the second keyways 55 in the rotation direction.

The key protrusions 61 are integrally formed on the inner circumferential surface of the rotor core 11 in the axial direction of the shaft 13, and formed to be spaced apart from each other in the rotation direction of the shaft 13 at a predetermined interval. Here, the key protrusions 61 may be formed to have a length that corresponds to the axial length of the rotor core 11 and the axial length of the second keyway 55, respectively. Further, the key protrusions 61 may be formed to have a width that corresponds to those of the first keyway 53 and the aforementioned catching projection 57, respectively. As such, once inserted into the second keyway in the rotation direction, these key protrusions 61 may be prevented by the catching projection 57 from being pulled out in the axial direction.

In the exemplary embodiment of the present invention, the fixing members 71 serve to fix the rotor core 11 and the shaft 13 in a state in which the rotor core 11 is coupled to the keyway portions 51 of the rotor core 11 in the axial direction and the rotation direction through the key protrusions 61. That is, the fixing member 71 serves to fix the rotor core 11 in the axial direction relative to the shaft 13, and may be provided as a metal pin having a specific length, fitted into the second keyway 55 through the first keyway 53, and inserted into the first and second keyways 53 and 55 from the open end to the closed end of the shaft 13. The fixing member 71 may be formed to have a length that corresponds to the axial length of the shaft 13, and formed to have a width that corresponds to the first keyway 53 and the aforementioned catching projection 57, respectively.

Hereinafter, a process of assembling the rotor core 11 and the shaft 13 using the rotor fixing unit 100 for a drive motor according to the exemplary embodiment of the present invention, which is configured as described above, will be described with reference to the aforementioned drawings and the accompanying drawings.

First, in the exemplary embodiment of the present invention, the key protrusions 61 of the rotor core 11 are coupled to by being inserted in the first keyways 53 of the keyway portions 51 in the axial direction of the shaft 13 (a direction of a solid line arrow in the drawing), as illustrated in FIG. 2.

Then, the key protrusions 61 are coupled to by being inserted in the second keyways 55 through the first keyways 53 in the axial direction, and the rotor core 11 is positioned on the outer circumferential surface of the shaft 13.

In this case, since the key protrusion 61 is formed to have the length that corresponds to the axial length of the second keyway 55, the key protrusion 61 is positioned within one side region of the second keyway 55, and since the first keyway 53 is formed to have the length that corresponds to a difference in axial length between the shaft 13 and the rotor core 11, the first keyway 53 is exposed to the outside.

In this state, in the exemplary embodiment of the present invention, the rotor core 11 is rotated in the rotational direction of the shaft 13 (a direction of dotted line arrows in FIGS. 2 and 3) to fix the rotor to the shaft, as illustrated in FIG. 3. As a result, the key protrusion 61 of the rotor core 11 is slidingly moved toward the other side region of the second keyway 55, and coupled within the other side region in the rotation direction. In this case, the key protrusion 61 is supported by the catching projection 57, such that the key protrusion 61 may be prevented from being pulled out of the other side region of the second keyway 55 in the axial direction. Accordingly, in the exemplary embodiment of the present invention, the catching projections 57 support the key protrusions 61, thereby fixing the rotor core 11 in the axial direction relative to the shaft 13.

Figure 4:
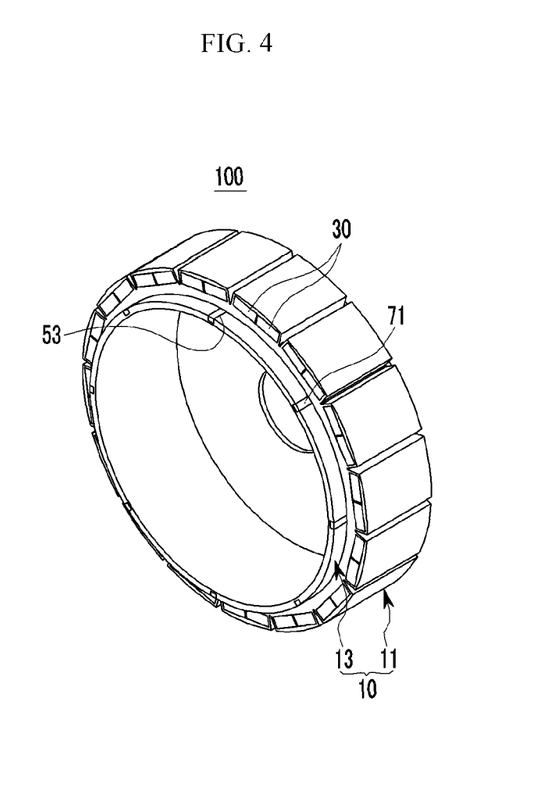
FIG. 4 is a partially coupled perspective view illustrating a state in which a rotor core and a shaft are assembled by the rotor fixing unit for a drive motor according to the exemplary embodiment of the present invention.

Thereafter, in the exemplary embodiment of the present invention, the fixing members 71 are coupled to by being inserted in the first keyways 53 of the keyway portions 51 in the axial direction of the shaft 13 (a direction of a solid line arrow in FIG. 3), as illustrated in FIGS. 3 and 4. Then, the fixing member 71 is coupled within the one side region of the second keyway 55 in the axial direction through the first keyway 53. As such, the fixing members 71 are inserted in both the first keyways 53 and the second keyways 55. Accordingly, in the exemplary embodiment of the present invention, the fixing member 71 is coupled within the one side region of the second keyway 55 in the axial direction through the first keyway 53, thereby fixing the rotor core 11 in the rotation direction relative to the shaft 13.

In the exemplary embodiment of the present invention, when the rotor core 11 and the shaft 13 are assembled through the aforementioned series of processes, the rotor core 11 may be fixed in the axial direction and the rotation direction relative to the shaft 13, by the keyway portions 51 of the shaft 13, the key protrusions of the rotor core 11, and the fixing members 71. Therefore, in the exemplary embodiment of the present invention, the rotor core 11 may be fixed in the axial direction and the rotation direction relative to the shaft 13, by coupling the keyway and the key protrusion, and then inserting the fixing member, thereby eliminating the retainer made of steel in the related art.

Accordingly, in the exemplary embodiment of the present invention, the retainer in the related art, which is made of steel that has low magnetic resistance and thus allows magnetic flux to flow well, is eliminated, such that a leakage of magnetic flux due to the retainer may be prevented from occurring, thereby improving efficiency of a motor through a reduction in copper loss and an improvement in output.

Moreover, in the exemplary embodiment of the present invention, since the retainer may be eliminated unlike the related art, a back electromotive voltage is increased. The increase in back electromotive voltage improves efficiency of reduction in copper loss because of a decrease in input current when the same torque is generated, and increases torque and output when the same current is applied.

Figure 5:
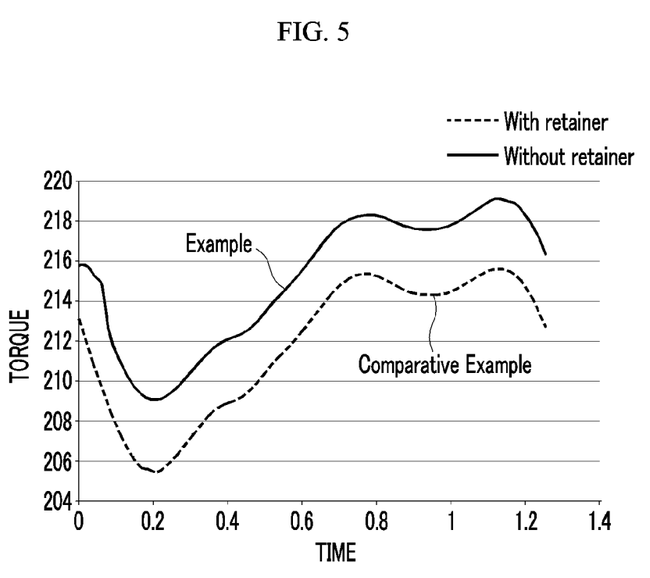
FIG. 5 is a graph for explaining an operational effect of the rotor fixing unit for a drive motor according to the exemplary embodiment of the present invention.

That is, as illustrated in FIG. 5, in the exemplary embodiment of the present invention, since the retainer may be eliminated unlike a Comparative Example, torque is increased by about 1.6% when the same current is applied. Therefore, in the exemplary embodiment of the present invention, when the same torque is generated, an input current may be reduced by 1.6%, and a copper loss may be reduced by 2.56%.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

10 . . . Rotor
11 . . . Rotor core
13 . . . Shaft
15 . . . Shaft aperture
30 . . . Permanent magnet
51 . . . Keyway portion
53 . . . First keyway
55 . . . Second keyway
57 . . . Catching projection
61 . . . Key protrusion
71 . . . Fixing member

What is claimed is:

1. A rotor fixing unit for a drive motor which fixes a rotor core to a shaft, comprising:
    a plurality of keyway portions formed in an outer circumferential surface of the shaft, wherein each keyway portion includes a first keyway formed in an axial direction of the shaft, and a second keyway connected to the first keyway in a rotational direction of the shaft;
    a plurality of key protrusions each coupled to one of the keyway portions, respectively, wherein the plurality of key protrusions are formed on an inner circumferential surface of the rotor core, and
    a plurality of fixing members that fixes the shaft and the rotor core to each other by being inserted into the first keyway.

2. The rotor fixing unit of claim 1, wherein:
    the keyway portions are spaced apart from each other in the rotational direction at a specific interval.

3. The rotor fixing unit of claim 1, wherein:
    the rotor core via the key portions each being inserted in the first keyway in the axial direction, and inserted in the second keyway in the rotational direction.

4. The rotor fixing unit of claim 1, wherein:
    each keyway portion has a catching projection that connects the first keyway with the second keyway.

5. The rotor fixing unit of claim 4, wherein:
    the catching projection is formed to have a width, which corresponds to that of each key protrusion, and prevents each key protrusion from being pulled out in the axial direction.

6. The rotor fixing unit of claim 5, wherein:
    the fixing member and the first keyway each have a width that corresponds to that of the catching projection.

7. The rotor fixing unit of claim 1, wherein:
    the shaft has an axial length that is longer than an axial length of the rotor core.

8. The rotor fixing unit of claim 7, wherein:
    the first keyway is formed to have a length that corresponds to a difference in axial length between the shaft and the rotor core.

9. The rotor fixing unit of claim 8, wherein:
the key protrusion is formed to have a length that corresponds to the axial length of the rotor core, and
the second keyway is formed to have a length that corresponds to the axial length of each key protrusion.

10. The rotor fixing unit of claim 7, wherein:
the fixing member has a length that corresponds to the axial length of the shaft.

11. A rotor fixing unit for a drive motor which fixes a rotor core to a shaft, wherein
w rotor core is coupled to an outer circumferential surface of the shaft by being inserted into a portion of the shaft in an axial direction and a rotational direction, and
the shaft and the rotor core are fixed by keys being inserted into portions of the shaft in both the axial and rotational directions.

12. The rotor fixing unit of claim 11, wherein:
a plurality of keyway portions, which includes first keyways formed in the axial direction of the shaft, and second keyways connected to the first keyways in the rotational direction, are formed in the outer circumferential surface of the shaft and are spaced apart from each other in the rotational direction at a specific interval, and
a plurality of key protrusions, which are each inserted into the keyway portions, respectively, and are formed on an inner circumferential surface of the rotor core.

13. The rotor fixing unit of claim 12, wherein:
a fixing member is inserted into each of the first keyways.

\* \* \* \* \*